United States Patent

Furukawa et al.

[11] Patent Number: 6,143,213
[45] Date of Patent: Nov. 7, 2000

[54] SECONDARY CELL AND THE PRODUCING METHOD THEREOF

[75] Inventors: Nobuhiro Furukawa; Masahisa Fujimoto; Noriyuki Yoshinaga, all of Osaka; Koji Ueno, Hyogo, all of Japan

[73] Assignee: Sanyo Electric Co., Ltd., Moriguchi, Japan

[21] Appl. No.: 08/103,055

[22] Filed: Aug. 9, 1993

Related U.S. Application Data

[63] Continuation of application No. 07/850,525, Mar. 13, 1992, abandoned.

[30] Foreign Application Priority Data

Apr. 5, 1991 [JP] Japan .................................... 3-73119

[51] Int. Cl.[7] .................................................. C01B 31/02
[52] U.S. Cl. .................. 264/29.1; 423/447.2; 423/447.9; 429/231.8
[58] Field of Search ..................................... 429/194, 218, 429/231.8; 423/447.9, 447.2; 264/29.1

[56] References Cited

U.S. PATENT DOCUMENTS

| | | |
|---|---|---|
| 4,423,125 | 12/1983 | Basu . |
| 4,615,959 | 10/1986 | Hayashi et al. . |
| 4,863,814 | 9/1989 | Mohri et al. . |
| 4,869,979 | 9/1989 | Ohtani et al. . |
| 4,945,014 | 7/1990 | Miyabayashi et al. . |
| 4,978,600 | 12/1990 | Suzuki et al. . |
| 4,980,250 | 12/1990 | Takahashi et al. . |
| 5,053,297 | 10/1991 | Yamahira et al. . |

FOREIGN PATENT DOCUMENTS

| | | |
|---|---|---|
| 58-93176 | 6/1983 | Japan . |
| 2-26817 | 7/1988 | Japan . |

*Primary Examiner*—Stephen Kalafut
*Attorney, Agent, or Firm*—Merchant and Gould P.C.

[57] ABSTRACT

The present invention discloses a secondary cell. The secondary cell comprises a positive electrode, a negative electrode which is made of a carbon material, and non-aqueous electrolytic solution, wherein the secondary cell is characterized in that the carbon material as the material of the negative electrode is produced by carbonizing natural high polymers.

7 Claims, 3 Drawing Sheets

6,143,213

SECONDARY CELL AND THE PRODUCING METHOD THEREOF

CROSS-REFERENCE TO RELATED APPLICATION

This application is a continuation under 35 USC 120 of U.S. Ser. No. 07/850,525 filed Mar. 13, 1992 now abandoned.

BACKGROUND OF THE INVENTION (1) Field of the Invention

The present invention relates to a secondary cell having a carbon material as a negative electrode and having a non-aqueous electrolytic solution and the producing method thereof.

(2) Description of the Prior Art

As a lithium secondary cell having lithium as a negative electrode retains a high energy density, much research has been carried out in order to realize its practical use. However, lithium utilized in the negative electrode of the lithium secondary cell described above has a problem in that its charge/discharge cycle characteristics deteriorate due to its low charge/discharge efficiency.

In order to solve the above problem, several methods have been proposed, such as utilizing a lithium alloy composed of lithium and aluminum as the material of a negative electrode or utilizing a $LiAsF_6$ series electrolytic solution in order to enhance the charge/discharge efficiency of lithium and, consequently, improve charge/discharge cycle characteristics. However, in the former method, the voltage of the cell is lowered and in the latter method, the safety of the cell cannot be ensured as the utilized electrolytic solution is noxious.

Japanese Patent Publication Laid-Open No. 62-90863 teaches a method for utilizing a carbon material as the material of a negative electrode.

Although a secondary cell having a carbon system material as the material of a negative electrode solves the problem of lowering the voltage and provides higher safety due to its utilization of no noxious electrolytic solution, its lower energy density becomes a new problem.

A carbon material used as a negative electrode is limited to materials which have a property of desorbing and absorbing lithium. Among the materials with such a property, cokes retain excellent availability. However, cokes have many almost irremovable impurities within themselves. Therefore, in a secondary cell having cokes as the material of a negative electrode, the decomposition of the electrolytic solution occurs, which results in the problem of deteriorating charge/discharge cycle characteristics and storage characteristics.

SUMMARY OF THE INVENTION

The present invention has a primary object of providing a secondary cell with a high energy density, improved charge/discharge cycle characteristics and improved storage characteristics.

Also, the present invention has another object of providing a secondary cell with charge/discharge efficiency of substantially 100%.

Moreover, the present invention has another object of providing a secondary cell which utilizes no noxious materials.

Further, the present invention provides practical production methods for the above-described secondary cell.

The above objects are fulfilled by a secondary cell comprising a positive electrode, a negative electrode which is made of a carbon material and substantially free from lithium metal, and a non-aqueous electrolytic solution, characterized in that the carbon material is the carbonized material of natural high polymers. The negative electrode is formed from materials other than lithium, although it is recognized that the electrode in use may pick up minor amounts of lithium from the electrolytic solution. The production method thereof is characterized in that the material of a negative electrode includes a carbon material which is produced by carbonizing natural high polymers, or characterized in that natural high polymers are carbonized at the temperature ranging from 500° C. to 1000° C., or characterized in that natural high polymers are carbonized by soaking in heated concentrated sulfuric acid. Also, the above objects may be fulfilled by the secondary cell described above, wherein the crystal thickness, i.e., the crystallite size in the direction of the c axis, the crystal Lc, of a carbon material (herein it refers to a distance between carbon molecules) analyzed by X-ray diffraction is 10 Å or less, or wherein carbohydrates are utilized as natural high polymers, or wherein ring compounds are utilized as natural high polymers, or wherein biopolymer is utilized in the form of ring compounds and the number of carbons forming its ring is 4 through 8.

The reason the above objects are fulfilled is assumed to be the following:

carbon materials such as cokes are conventionally utilized as the material of a negative electrode as they are able to intercalate lithium ions. However, they are not preferable for the material of a negative electrode because the property of intercalating lithium ions alone does not solve problems such as decreasing cell capacity.

Thus, in the course of various experiments by the inventors of the present invention, it was found that the crystal thickness of a carbon material affected the cell capacity considerably. A carbon material with larger crystal thickness, such as graphite, is almost unable to intercalate lithium, and thus, a side reaction of decomposition of the electrolytic solution proceeds. Also, the decomposition of electrolytic solution occurs as well in a carbon material with the smaller crystal thickness, such as amorphous carbon, due to its large specific surface area and various active sites.

Concerning the above results of experiments, the inventors had an experiment on a carbon material with a small specific surface area and the smaller crystal thickness, and such a material proved to retain an excellent property for the material of a negative electrode.

More specifically, although amorphous carbon has the property of intercalating lithium ions, the decomposition of the electrolytic solution, due to the various active sites in response to the large specific surface area, negates any advantages of the intercalating property. Therefore, the present invention provides a secondary cell utilizing amorphous carbon with the improved property of intercalating lithium ions by minimizing the active sites through diminution of the specific surface area.

To be more concrete, in this invention, natural high polymers are utilized instead of synthetic high polymers which have been utilized conventionally as high polymers. As natural high polymers have a regular degree of polymerization while synthetic high polymers have an irregular one, after they are carbonized, the obtained materials come to retain even characteristics and uneven characteristics respectively. Thus, a carbon material with an even and smaller specific surface area and, as a result, the property of restraining of decomposition of the electrolytic solution, can be obtained in the present invention.

Although any natural high polymers can be utilized as a carbon material, the most preferable are carbohydrates such as cellulose, or ring compounds such as a biopolymer in which the number of carbons forming the ring is 4 through 8.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENT (The First Embodiment)

EXAMPLE

Figure 1:
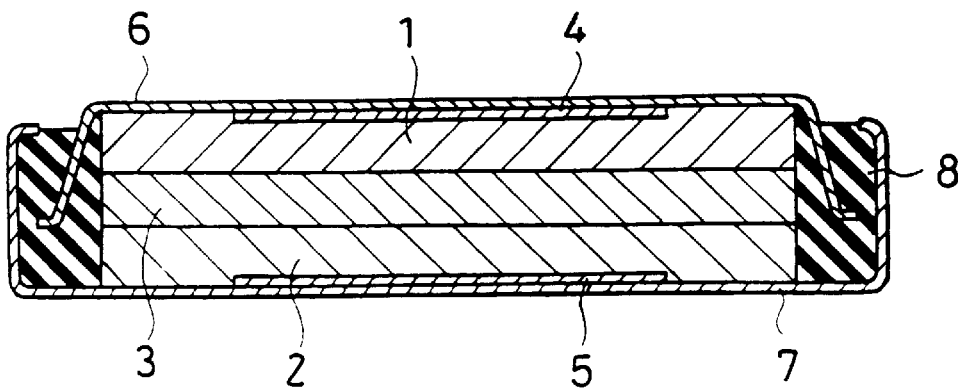
FIG. 1 is a the cross section of the secondary cell of the prevent invention which shows its structure.

FIG. 1 is the cross section of the flat type non-aqueous secondary cell of the present invention. A negative electrode 2 made of a carbon material is pressure-contacted on the inner surface of a negative electrode collector 5. The negative electrode collector 5 is adhered to the inner bottom surface of a negative electrode can 7 made of ferritic stainless steel (SUS430). The edge of the negative electrode can 7 is fixed on a polypropylene insulating packing 8. A positive electrode can 6 is fixed inside of the insulating packing 8. A positive electrode collector 4 is adhered to the inner bottom surface of the positive electrode can 6. A positive electrode 1 made of cobalt oxide is pressure-contacted on the inner surface of the positive electrode collector 4. A separator 3 is disposed between the positive electrode 1 and the negative electrode 2. The separator 3 is formed of a polypropylene microporous thin membrane and is impregnated with electrolytic solution. The electrolytic solution is produced by dissolving lithium perchlorate in propylene carbonate.

The negative electrode 2 utilized in the embodiment was produced as follows:

A filter paper made from natural fiber such as cellulose was vacuum heat-treated for 5 hours at 750° C. in order to be carbonized. After the carbonized natural fibers of 400 mesh or below were sorted out, they were pressed in order to form a negative electrode. Hereinafter, a cell produced in this method is referred to as Cell (A).

COMPARATIVE EXAMPLE

A cell was produced in the same method of Cell (A) except the negative electrode was formed of cokes (heat-treated caking coal in coke oven), which were conventionally utilized. Hereinafter, a cell produced in this method is referred to as Cell (X).

[Experiment 1]

Figure 2:
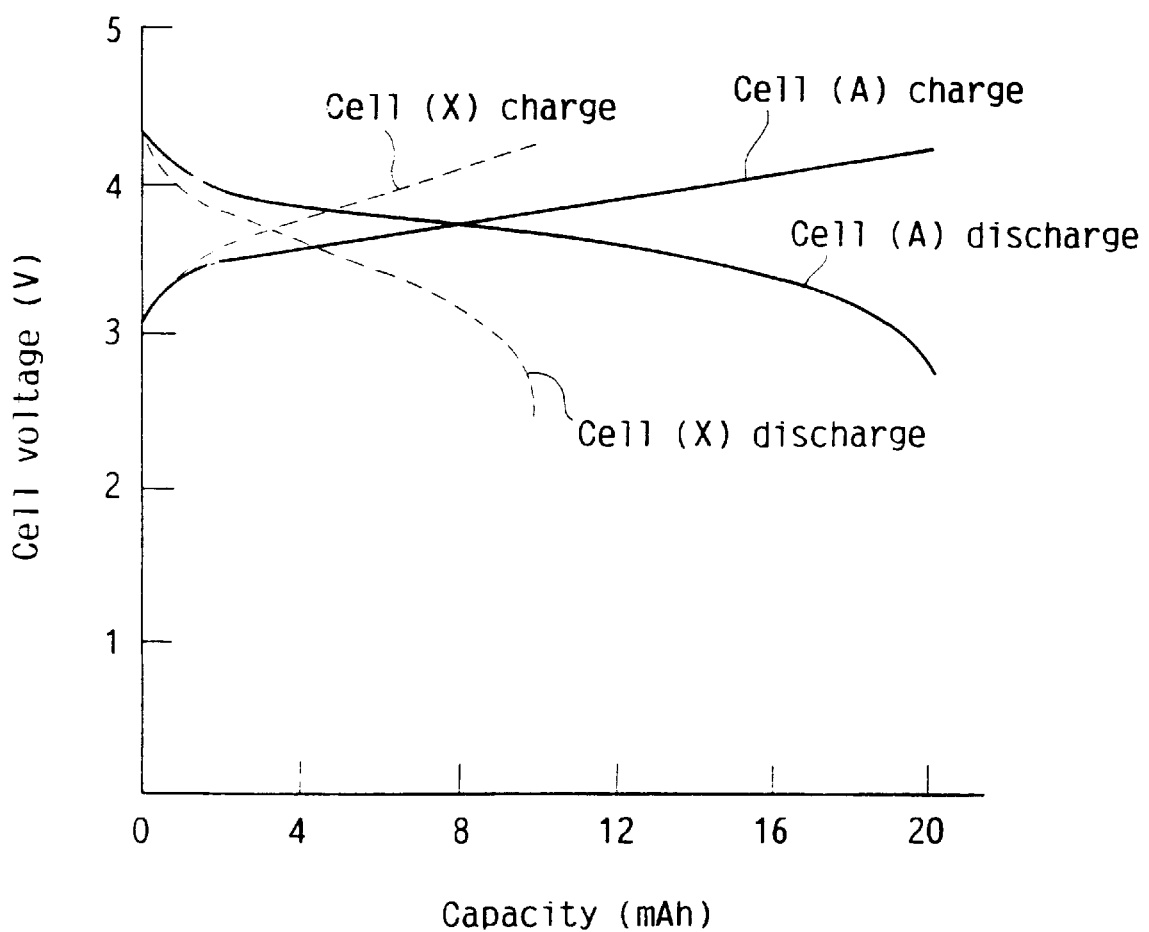
FIG. 2 is a graph showing charge/discharge characteristics of the secondary Cell (A) of the present invention and Cell (X) of a Comparative Example.

FIG. 2 shows the charge/discharge characteristics of Cell (A) of the present invention and Cell (X) of the Comparative Example. They were charged in a current of 1 mA to the charge ending voltage of 3.0V and discharged in a current of 1 mA to the discharge ending voltage of 2.0V.

As shown in FIG. 2, Cell (A) of the present invention had a capacity of 20 mAh while Cell (X) only had a capacity of 10 mAh. Hence, it was confirmed from the result that the cell capacity could be improved when a carbon material produced by carbonizing natural high polymers was utilized as a negative electrode.

[Experiment 2]

In Experiment 2, the range of the temperature of carbonization of natural high polymers was examined.

Cells were produced in the same method of Cell (A) except filter papers made from natural fiber such as cellulose were vacuum heat-treated for 5 hours at 400° C., 500° C., 750° C., 1000° C. and 1100° C. in order to be carbonized. Hereinafter, these cells produced in this method are referred to as Cell (B1) through Cell (B5) respectively.

Figure 3:
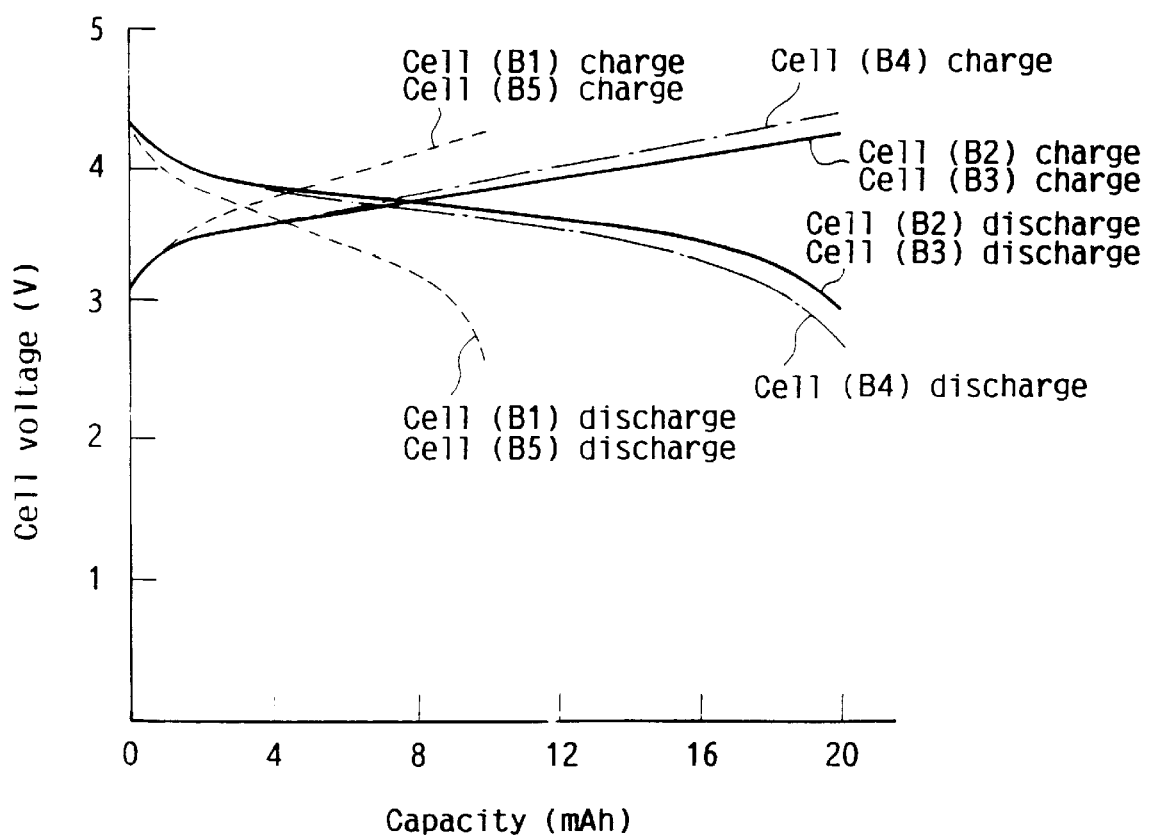
FIG. 3 is a graph showing charge/discharge characteristics of Cell (B1) through Cell (B5) of the present invention.

FIG. 3 shows the charge/discharge characteristics of Cell (B1) through Cell (B5) of the present invention and Cell (X) of the Comparative Example. They were charged in a current of 1 mA to the charge ending voltage of 3.0V and discharged in a current of 1 mA to the discharge ending voltage of 2.0V.

As shown in FIG. 3, Cell (B2) through (B4) had a capacity of 20 mAh while Cell (B1) and (B5) had a capacity of only 10 mAh or less. Hence, it was confirmed from the result that the most preferable temperature of the carbonization of high polymers ranged from 500° C. to 1000° C.

The reason is assumed to be that when the temperature becomes more than 1000° C., graphitization of high polymers occurs and the carbonized material does not respond to lithium ions, and when the temperature becomes less than 500° C., many impurities remain within a carbonized material which deteriorate electrical conductivity.

Further, the carbon material produced by heat-treatment of natural high polymers at the temperature ranging from 500° C. to 1000° C. was examined by X-ray diffraction, and it was confirmed that the crystal thickness Lc of the carbon materials was 10 Å or less.

(The Second Embodiment)

In the Second Embodiment, the carbonizing method of natural high polymers was examined due to the following reason.

A requisite for the material of the negative electrode of a secondary cell is the use of natural high polymers with a property of desorbing and absorbing lithium. Among the materials with such a property, cokes retain excellent availability. However, as cokes have many almost irremovable impurities, they are not preferable for the material of a negative electrode.

Therefore, in the First Embodiment, it was explained that improved materials for a negative electrode can be produced by carbonizing natural high polymers by heat-treatment. Nevertheless, the carbon material produced in such a method still has several problems. In other words, because the carbon material is produced by heat-treatment, "C—C" bond among high polymers disconnects during the process. Moreover, an unexpected organic substance such as tar is produced. As it interferes with the carbonization, high polymers are not heated evenly and, as a result, the obtained carbon material is not characteristically even.

Thus, in order to solve the above problem, methods of carbonizing natural high polymers were examined by producing a cell described hereunder.

EXAMPLE

A negative electrode and a cell were produced in the same method of Cell (A) except a filter paper made from high polymers such as cellulose was soaked in heated concentrated sulfuric acid of 80° C. for 24 hours in order to produce a carbon material. Hereinafter the cell produced in this method is referred to as Cell (C).

COMPARATIVE EXAMPLE

Cell (X) in the Comparative Example of the First Embodiment was utilized.

[Experiment]

Figure 4:
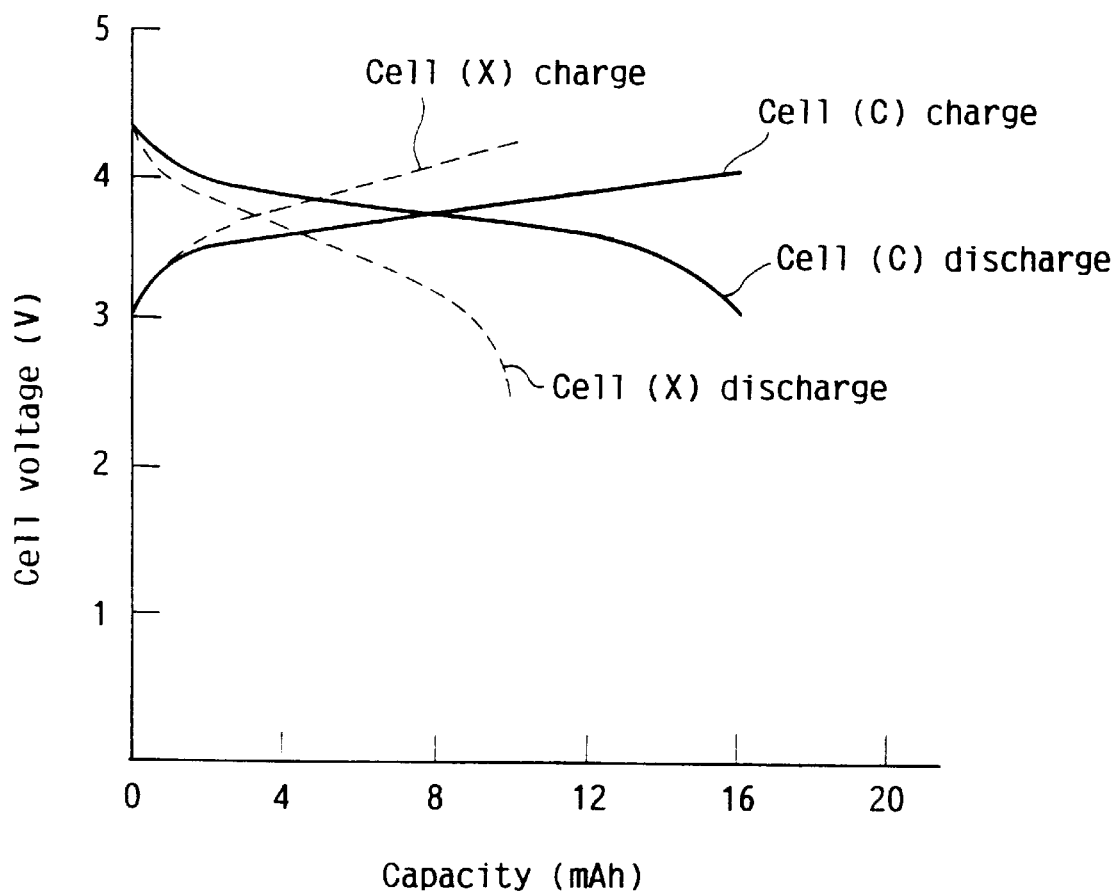
FIG. 4 is a graph showing charge/discharge characteristics of secondary Cell (C) of the present invention and Cell (X) of the Comparative Example.

FIG. 4 shows the charge/discharge characteristics of Cell (C) of the present invention and Cell (X) of the Comparative Example. They were charged in a current of 1 mA to the charge ending voltage of 3.0V and discharged in a current of 1 mA to the discharge ending voltage of 2.0V.

As shown in FIG. 4, the charge/discharge characteristics of Cell (C) of the present invention were improved versus those of Cell (X) of the Comparative Example.

The reason is assumed to be that when heated, concentrated sulfuric acid is utilized in carbonizing high polymers as in the above Embodiment, the carbon material does not become hot so that neither tar is produced nor "C—C" bond among high polymers is disconnected. Therefore, a carbon material with even characteristics is obtained as a result, the utility efficiency of an active material as the material of a negative electrode is enhanced, and the larger capacity is retained.

<<Remarks>>

In the above Embodiments, while cellulose was utilized as a carbon material, it may be replaced with carbohydrates or ring compounds, particularly biopolymer in which the number of carbons forming the ring is 4 through 8.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In a method of producing a secondary cell comprising a positive electrode, a negative electrode and a non-aqueous electrolytic solution, the improvement wherein the negative electrode is produced by a process which comprises carbonizing a natural polymer at a temperature of from 500° C. to 1000° C. to provide a carbon material having a crystal thickness Lc of 10 Angstroms or less when analyzed by x-ray diffraction, the negative electrode being formed from materials other than lithium metal.

2. The method of claim 1 wherein the polymer is carbonized by soaking in heated concentrated sulfuric acid.

3. The method of claim 1 wherein the polymer is a carbohydrate.

4. The method of claim 1 wherein the polymer is a ring compound.

5. The method of claim 4 wherein the ring compound is a biopolymer having from 4 to 8 carbon atoms in the ring.

6. In a method of producing a secondary cell comprising a positive electrode, a negative electrode and a non-aqueous electrolytic solution, the improvement wherein the negative electrode is produced by a process which comprises carbonizing a cellulose at a temperature of from 500° C. to 1000° C. to provide a carbon material having a crystal thickness Lc of 10 Angstroms or less when analyzed by x-ray diffraction, the negative electrode being formed from materials other than lithium metal.

7. The method of claim 6, wherein the cellulose is carbonized by soaking in heated concentrated sulfuric acid.

* * * * *